Figure 1:
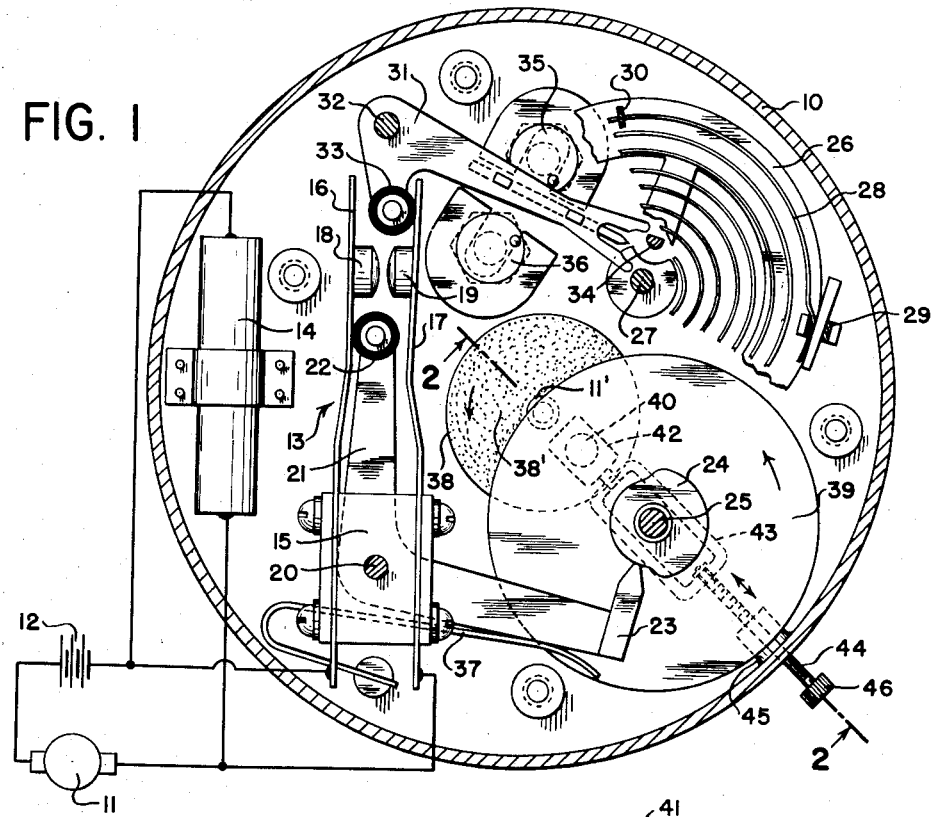

Jan. 13, 1959　　　A. W. HAYDON　　　2,869,062

MOTOR SPEED GOVERNOR

Filed Dec. 17, 1956

INVENTOR
Arthur W. Haydon
BY
ATTORNEYS

United States Patent Office 2,869,062
Patented Jan. 13, 1959

2,869,062

MOTOR SPEED GOVERNOR

Arthur W. Haydon, Milford, Conn., assignor to Consolidated Electronics Industries Corporation, Waterbury, Conn., a corporation of Delaware Application December 17, 1956, Serial No. 628,712

6 Claims. (Cl. 318—311)

The present invention relates to a speed governor device for an electric motor, and more particularly to an improved and simplified electro-mechanical constant speed device for adjustably setting a constant speed level of operation for an electric motor of the type having a tendency to operate at speeds which fluctuate if the load thereon or the terminal voltage thereof changes. The new governor device is of a type disclosed and claimed in my prior United States Patents Nos. 2,523,298 and 2,740,080, but is an improvement thereon in that means are incorporated in the new device for adjusting the speed of a motor to different constant levels, covering a substantial range of speeds.

My above-mentioned patents disclose motor speed governor arrangements in which a motor is supplied, through a pair of switch contacts, with an electric current sufficient to tend to cause the motor to run at a speed above a predetermined desired value, regardless of normal variations in terminal voltage or motor load. The motor is caused to run at the desired speed by opening and closing the switch contacts at proper times; and, to this end, a mechanical constant speed device is provided which effects a closing of the contacts at constant fixed intervals independent of the speed of the motor, while the latter operates near the predetermined desired speed therefor. The governor also includes means responsive to the operation of the motor, at speeds near the predetermined desired speed therefor, for opening the contacts between successive closings thereof. The arrangement is such that if the instantaneous motor speed tends to exceed that set by the mechanical constant speed device, the contacts will open more quickly following each successive closure thereof. If the motor tends to slow down slightly, due to increased load and/or decreased terminal voltage, the contacts will remain closed for longer periods after each successive closing, so that the total power supplied to the motor is sufficient to cause it to run at a predetermined desired average speed level.

In the governors of my prior patents, as in that of this invention, the mechanical constant speed device is advantageously in the form of a conventional balance wheel device, of the type incorporated in most mechanical timepieces. Such a balance wheel device comprises a small accurately balanced wheel journaled in relatively friction-free bearings and adapted to be oscillated back and forth by means of a coiled hairspring. The balance wheel is kept in motion by periodical force impulses imparted thereto, and, under normal conditions, the frequency of oscillation is determined by the inertia of the balance wheel and the characteristics of the hairspring and is constant. Accordingly, while my prior governor mechanisms, utilizing such mechanical constant speed devices, are effective in controlling the speed of the motor with substantial precision, they are subject to the limitation that the governed motor speed is fixed by the balance wheel characteristics and is not readily adjustable to different constant levels.

In accordance with this invention, an improved motor speed governor device is provided which incorporates all the advantages of the devices characterized by my prior patents, and which has the further substantial advantage of providing for adjustment of the motor speed to different constant values, covering a relatively wide range of speeds. Thus, in a governor device of the type herein concerned, the switch contacts are acted upon by a first means driven by the motor and by a second means operated by the constant speed device. The motor driven switch actuating means are operative to displace the switch contacts without necessarily, however, causing them to open. The constant speed operated means are operative after the contacts have been displaced to hold one contact in a displaced position. Displacement of the other contact then causes the contacts to open. At a fixed time thereafter, independent of the motor speed and determined solely by the frequency of the constant speed device, the constant speed operated means releases the retained contact and permits the contacts to close. Following this, the contacts will remain closed for a portion of the cycle the length of which is dependent upon the speed of the motor. For proper operation, the motor driven actuating means must move through a complete cycle of operations, displacing the contacts from one side to the other and back, during each complete cycle of the constant speed device. Accordingly, the average speed of operation of the motor driven actuating means is fixed by the constant speed device, and, while it is possible to regulate the speed or frequency of operation of the constant speed device somewhat, such regulation is so limited as to be of little or no practical value.

In the new governor device, an adjustable drive mechanism is provided by means of which the number of revolutions of the governed motor for each cycle of operation of the constant speed mechanism may be varied. Thus, while the motor driven actuator means must run at the same average speed as the constant speed mechanism under normal operating conditions, the motor may be caused to run at various constant speed levels by varying the relationship between revolutions of the motor and cycles of the motor driven actuator means. The new governor device thus provides for adjusting the speed of the governed motor to different constant speed levels within a predetermined range of speeds while retaining the accurate and dependable speed regulation afforded by my earlier governor designs.

In the governor device of the present invention, the speed of the motor is adjustably related to the cyclical movement of the motor driven switch actuator by means of an effective, but simplified transmission mechanism capable of infinite adjustment within a predetermined range of adjustability. The transmission or drive mechanism includes a control element which may be exposed externally of the governor casing whereby to be freely accessible at all times. Further, in this respect, it is an advantageous feature of the new governor device that the governed speed of the motor may be adjusted while the motor is in operation, so that the speed thereof may be readily set to a desired level by means of a suitably calibrated dial, for example, coacting with the control element.

Figure 2:
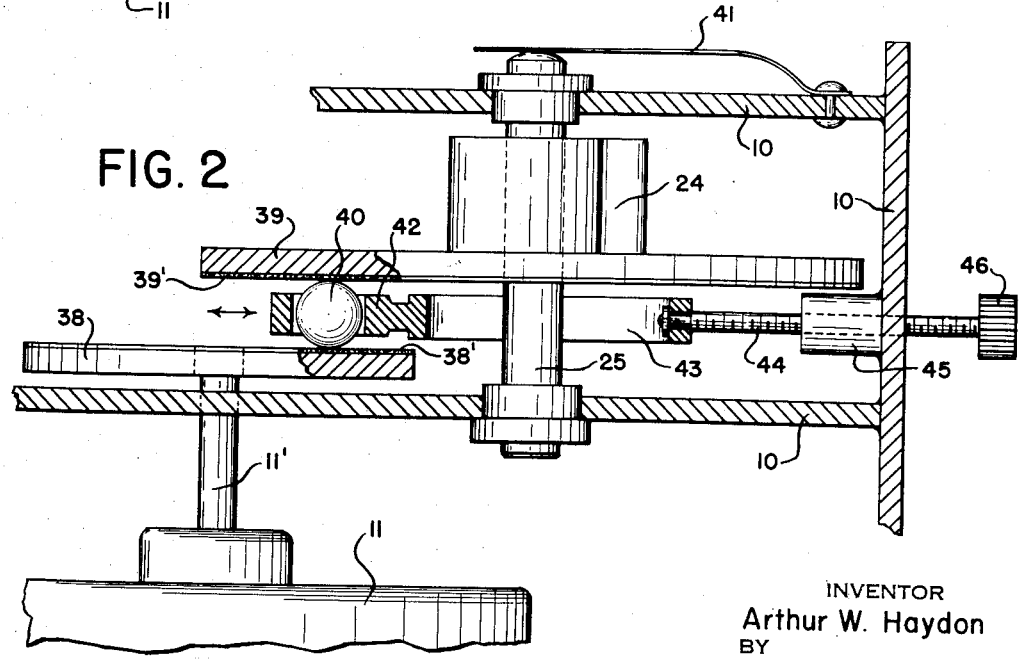

For a better understanding of the invention, reference may be made to the following detailed description and accompanying drawings, in which:

Fig. 1 is a cross-sectional view of a motor speed governor device constructed in accordance with the present invention, with parts broken away, and showing the motor energizing circuit in schematic form; and Fig. 2 is an enlarged fragmentary cross-sectional view taken generally on 2—2 of Fig. 1.

Referring now to the drawing, the numeral 10 designates a casing or housing for the new governor device, the housing advantageously being secured at one end of a motor housing, not shown, with the rotor shaft 11' of the motor projecting into the governor housing. For purposes of illustration, the motor is illustrated schematically at 11 in Fig. 1. The motor 11 is in circuit with a suitable power source 12 through a first current path including a switch 13 and a second current path including a resistance element 14. When the switch 13 is closed, a shunt path is provided around the resistance element 14, so that the full voltage from the power source 12 is applied across the terminals of the motor 11. And, in accordance with the practice set forth in my before-mentioned prior patents, the power source 12, when directly applied to the motor 11, is sufficient to drive the motor at a speed greater than the highest desired constant level of speed, under all normal operating conditions, and taking into consideration such normal voltage and load variations as may occur from time to time. When the switch 13 is opened, the resistance element 14 is placed in series with the motor 11, so that a reduced voltage is supplied to the motor terminals, tending to operate the motor at a speed less than the lowest desired constant level of speed. Thus, in order to operate the motor 11 at a predetermined desired speed, a constant speed reference device is employed to control, in combination with the motor, the opening and closing of the switch 13 in a manner such that the motor is operated at a predetermined constant level of speed.

In the illustrated form of the invention, the switch 13 comprises a mounting block 15 to which are secured a pair of spaced spring contact supports 16, 17. Near the upper end of the supports 16, 17 are opposed contacts 18, 19, which are normally held in a closed position by the resilient force of the spring supports 16, 17.

Pivotally mounted adjacent the switch 13, by means of a shaft 20, is a switch actuating bell crank type lever 21 having an insulated arm 22 positioned between the spring contact supports 16, 17. The lever 21 is adapted to be actuated to press its arm 22 against one or the other of the spring supports 16, 17 to displace the supports laterally. At the end of the lever 21 opposite from the arm 22 is a cam follower 23 adapted to bear against a cam 24 mounted on a shaft 25 journaled in the housing 10. In a manner to be described in greater detail, the shaft 25 is driven by the rotor shaft 11' of the motor 11. Accordingly, the switch actuating lever 21 is operated in response to operation of the motor and serves to laterally displace the contacts 18, 19 in a definite predetermined relation to rotations of the motor shaft.

As set forth in my prior patents, governing of the speed of rotation of the motor 11 is effected by means of a mechanical constant speed device which acts upon the contact supports 16, 17 to hold one of the contacts in a displaced position after it has been moved to such position by the motor driven switch actuating arm 22. At fixed periodical times in each cycle a displaced contact is released by the constant speed mechanism and is permitted to close with the other contact to cause full power to be applied to the motor. Continued rotation of the motor moves the actuating arm into a position displacing the contacts in the other direction, so that the contacts are eventually reopened. The length of time, in each cycle of operation, during which the contacts are closed depends upon the instantaneous relative speeds of the motor and constant speed mechanism. That is, the contacts will close at a definite time during each cyclic period and will remain closed for a portion of such period determined solely by the instantaneous motor speed when the latter is near the predetermined desired level.

In the illustrated form of the invention, the constant speed device comprises a balance wheel 26 supported for rotation by a pin 27, mounted in one wall of the housing 10. A coiled hairspring 28 is secured at one end to the balance wheel and at its other end to a fixed post 29 carried by the housing 10. In accordance with well-known principles, the characteristics of the balance wheel 26 and hairspring 28 will cause the wheel 26 to oscillate at a predetermined frequency, once it is set in motion. Also in accordance with well-known principles, the normal or predetermined frequency of the balance wheel may be varied slightly by adjusting the effective length of the hairspring 28, as by means of a movable member 30.

The illustrated constant speed device also includes a balance wheel lever 31 pivoted on a shaft 32 carried by the housing 10. The lever 31 has an insulated actuating arm 33 at one end which is positioned between the spring contact supports 16, 17, adjacent the upper end thereof, and is adapted alternately to engage the supports. The opposite end of the balance wheel lever 31 has a suitable notch adapted to receive an impulse pin 34 carried by the balance wheel. As the wheel 26 oscillates, the impulse pin 34 enters the lever notch from one direction or the other to engage and shift the balance wheel lever 31. The movement of the balance wheel lever 31 is, of course, limited by means such as magnetic stops 35, 36, which serve to stop the lever at the end of its movement and to hold the lever in its limit position until it is engaged by the impulse pin 34 on the return oscillation of the balance wheel.

As will be understood, the mechanical constant speed device derives its energy from the energy stored in one of the spring contact supports 16 or 17, as the case may be, immediately after the impulse pin 34 starts moving the balance wheel lever 31 away from the magnetic stop which is holding it. During the starting interval of the motor, if the contacts are first displaced by the motor driven actuating arm 22, to an extent such that the balance wheel lever 31 moves into and is held in one of its limit positions, the arm 33 of the balance wheel lever will hold one of the contact supports in its displaced position, until the balance wheel lever is dislodged by the impulse pin 34 upon a return oscillation of the balance wheel 26. Thus, with reference to Fig. 1, when the high part of the cam 24 moves into contact with the cam follower 23, the lever 21 will be pivoted in a clockwise direction, so that the arm 22 thereof engages the right-hand contact support 17 and displaces it to the right. This will not cause the contacts 18, 19 to separate, however, since the spring support 16 has sufficient spring tension to follow up the displaced contact support 17, and move the balance wheel lever 31 in a counterclockwise direction, thus initiating the first half-oscillation of the balance wheel in a clockwise direction, through pressure against the impulse pin 34. Several such half oscillations may occur, first in one direction and then in the other, until the amplitude of oscillation of the balance wheel is sufficient to allow the balance wheel lever 31 to become engaged with the magnetic stop 35 and be held thereby, the motor speed, of course, increasing in the interim. When the cam 24 subsequently rotates to a point where the low portion of the cam underlies the cam follower 23 a spring 37 acts upon the main lever 21, rotating the latter in a counterclockwise direction whereby the arm 22 thereof engages the contact support 16 and displaces it to the left. If at this time the motor 11 is tending to run at an instantaneous speed greater than that set by the balance wheel 26, the contact 17 will be held in its displaced position by the balance wheel lever 31, causing the contacts 18, 19 to be separated and connecting the resistance element 14 into circuit with the motor. The balance wheel lever 31 will be subsequently released at a fixed period in the cycle by a return oscillation of the balance wheel. If the load and voltage conditions are such that the motor 11 tends to operate only slightly above the predetermined constant speed level, the contacts 18, 19 will remain closed for most of the cycle. However, if the motor 11 tends to run at a substantially greater speed than is desired, the frequency of displacement of the contact supports will become increasingly out of phase with the balance wheel oscillations, whereby the contacts are opened more quickly after each closure thereof.

It will be readily understood, of course, that the balance wheel lever 31 is operative to engage and retain the contact support 16 in displaced position in the same manner as described with respect to the contact support 17. Accordingly, during normal operation, the contacts 18, 19 will be opened and closed twice for each revolution of the motor driven cam 24 and each complete cycle of oscillation of the balance wheel 26.

From the foregoing description, it will be seen that the average speed of rotation of the motor driven cam 24 is equal to the frequency of oscillation of the balance wheel 26. Accordingly, in the device of the present invention, adjustable regulation of the motor speed is effected by providing a novel drive system in which the rotation of the cam 24 is adjustably related to the rotation of the motor shaft 11'. To this end, a driving disc is secured to the end of the motor shaft 11' for rotation therewith. Spaced from the front face of the driving disc 38, and adapted for rotation about an axis parallel to but laterally offset from the axis of the motor shaft, is a driven disc 39 which is secured to the shaft 25, in fixed relation to the cam 24. Between the driving and driven discs 38, 39 is a transmission element 40, which is advantageously in the form of a spherical element. The transmission element 40 is adapted to be held in friction contact with the opposing surfaces of the discs 38, 39, and to this end, suitable means such as a light spring 41, acting axially against the shaft 25, may be employed to urge one of the discs toward the other.

As shown best in Fig. 2, the spherical transmission element 40 is held in position between the driving and driven discs 38, 39 by means of a cage 42, which may have suitable anti-friction means, not shown, to facilitate rotation of the element 40 therein. The case 42 is carried at the end of a yoke 43, which surrounds the cam supporting shaft 25 and has an elongated opening therein providing for movement of the yoke transversely of the shaft 25. Secured to the opposite end of the yoke 43, and adapted for rotation with respect thereto, is an adjusting screw 44. The screw 44 is threadedly received in a boss 45 on the housing wall and has a portion 46 exposed externally of the housing whereby the screw may be manipulated by hand, or with suitable tools.

Most advantageously, the adjusting screw 44, yoke 43 and cage 42 are aligned along an axis intersecting the cam supporting shaft 45 and motor shaft 11', with the transmission element 40 being located on such axis, in a position between the shafts 11' and 25.

Upon rotation of the driving disc 38, the spherical transmission element 40 is caused to rotate within its cage 42 and thereby to impart rotation to the driven disc 39. Advantageously, the discs 38, 39 may be provided with suitable friction surfaces 38', 39' to avoid slippage in the drive system.

As will be understood, rotation of the driving disc 38 will cause the spherical transmission element 40 to rotate at a rate determined by the distance the element 40 is spaced from the axis of the motor drive shaft 11'. Likewise, the rotary speed imparted to the driven disc 39 by the element 40 is proportional to the distance of the element from the axis of the cam supporting shaft 25. Accordingly, by manipulating the adjusting screw 44 to shift the transmission element 40 toward and away from the axes of the shafts 11', 25, the driving relation between the discs 38, 39 may be varied. Thus, with reference to Fig. 2, if the transmission element 40 is shifted to the right, the number of revolutions of the element 40 produced by each revolution of the motor driven disc 38 will be increased. Simultaneously, the fraction of a revolution of the driven disc 39 produced by each revolution of the spherical transmission element 40 will be increased.

As a result, the driving disc 38 will have to rotate at a lower speed relative to the driven disc 39 in order that the period of rotation of the disc 39 remains the same as the period of mechanical constant speed device. Thus the output speed of the motor 11 will be decreased to effect this. Similarly, to increase the governed speed level of the motor 11, the adjusting screw 44 is manipulated to shift the spherical transmission element 40 to the left. Because, as indicated, the average governed speed of the driven disc 39 remains constant at all times, an adjustment of the level of constant speed of the governed motor speed is therefore effected by adjusting the drive ratio between the discs 38, 39.

The outstanding feature of the invention resides in the fact that an inexpensive and efficient electro-mechanical governing device of the type disclosed in my prior United States Patents Nos. 2,523,289 and 2,740,080 may be modified in a manner such that while all the advantageous features of the earlier governors are retained, at the same time provision is made for the adjustability of the governed motor speed to various constant speed levels throughout a desired range. Thus, the new governor device incorporates a mechanical constant speed element having a fixed frequency, operating in combination with a motor driven switch actuator the operating cycle of which is fixed with respect to the frequency of the constant speed mechanism. However, in the new device, a novel arrangement is provided for adjustably relating the actual rotations of the motor to the rotations or cycles of the motor driven actuating device. The accuracy and simplicity of my prior governors have been retained in all respects, while the adaptability and versatility of the governor have been greatly increased.

One of the important specific features of the invention resides in the simplified drive system utilized for adjustably relating the rotation of the motor to the motor driven timing cam. Thus, advantageously, a pair of friction discs may be employed, which are drivingly connected by means of a spherical transmission element engaging opposing surfaces of the discs. A simplified arrangement is provided for adjustably supporting the transmission element at various points between offset axes of the opposed discs whereby the speed of the driving disc is imparted to the driven disc in a variable relation, in accordance with the setting of an accessible adjusting screw.

It should be understood that the specific device herein illustrated and described is intended to be representative only, as certain changes may be made therein without departing from the clear teachings of the invention. Accordingly, reference should be made to the following appended claims in determining the full scope of the invention.

I claim:

1. In a motor speed governor for controlling the speed of an electric motor and of the type including an electric circuit for supplying sufficient current to the motor to tend to cause the motor to operate at a speed above a predetermined value, a pair of switch contacts in said circuit for opening and closing said circuit, motor driven means acting on said contacts and a mechanical constant speed device acting on said contacts and operable in combination with said motor driven means to effect closure of said contacts at intervals determined by said constant speed device and for durations determined by the instantaneous relative positions of said motor driven means and said constant speed device, the improvement in said motor driven means comprising a drive member driven by said motor in fixed predetermined relation to the speed thereof, switch actuating means for acting on said switch contacts and adjustable transmission means for adjustably relating the speeds of said switch actuating means and said drive member whereby the governed speed of said motor may be adjusted to different constant values.

2. The motor speed governor device of claim 1, characterized by said switch actuating means including a cam, and said adjustable transmission means comprising an adjustable drive connection between said cam and said drive member.

3. The motor speed governor device of claim 1, characterized by said drive member comprising a disc rotated by said motor, said switch actuating means comprising a second disc spaced from and facing said first disc, and said adjustable transmission means comprising a rotatable element engaging opposed faces of said discs.

4. The motor speed governor device of claim 3, characterized by said rotatable element comprising a spherical element, and said adjustable transmission means further comprising a cage for supporting said spherical element between said discs and an adjusting screw connected to said cage and having a portion accessible for manipulation.

5. In a motor speed governor for controlling the speed of an electric motor and of the type including an electric circuit for supplying sufficient current to the motor to tend to cause the motor to operate at a speed above a predetermined value, a pair of switch contacts in said circuit for opening and closing said circuit, motor driven cam means acting on said contacts, and a constant speed mechanism acting on said contacts and operable in combination with said motor driven means to effect closure of said contacts at intervals determined by said constant speed mechanism and for durations determined by the instantaneous relative positions of said motor driven means and said constant speed mechanism, the improvement which comprises means for adjustably relating the speed of said motor to the speed of said cam means whereby the governed speed of said motor may be adjusted to different constant values.

6. The motor speed governor device of claim 5, characterized by said means for adjustably relating said speeds comprising a first member having fixed driving relation with said motor, a second member including a cam for acting on said switch contacts, and an adjustable transmission element drivingly connecting said first and second members.

References Cited in the file of this patent

UNITED STATES PATENTS

| | | |
|---|---|---|
| 1,803,834 | Bates | May 5, 1931 |
| 2,422,306 | Laing | June 17, 1947 |
| 2,523,298 | Haydon | Sept. 26, 1950 |